(12) United States Patent
Op De Beeck et al.

(10) Patent No.: US 6,739,350 B1
(45) Date of Patent: May 25, 2004

(54) FUEL TANK

(75) Inventors: Joël Op De Beeck, Duffel (BE);
Yannick Gerard, Kraainem (BE);
Stéphane Leonard, Brussels (BE);
Jules-Joseph Van Schaftingen, Wavre (BE); Paul Wouters, Vilvoorde (BE);
Rufino Perez-Perez, St Pieters Leeuw (BE)

(73) Assignee: Solvay (Societe Anonyme), Brussels (BE)

( * ) Notice: Subject to any disclaimer, the term of this patent is extended or adjusted under 35 U.S.C. 154(b) by 0 days.

(21) Appl. No.: 09/980,013

(22) PCT Filed: May 29, 2000

(86) PCT No.: PCT/EP00/04924

§ 371 (c)(1),
(2), (4) Date: Feb. 26, 2002

(87) PCT Pub. No.: WO00/73644

PCT Pub. Date: Dec. 7, 2000

(30) Foreign Application Priority Data

Jun. 1, 1999 (BE) .............................................. 9900382

(51) Int. Cl.[7] .............................................. F16K 24/04
(52) U.S. Cl. ........................ 137/202; 123/519; 137/43; 137/587

(58) Field of Search ............................ 123/519; 137/43, 137/202, 587

(56) References Cited

U.S. PATENT DOCUMENTS

| | | | |
|---|---|---|---|
| 3,910,302 A | | 10/1975 | Sudhir |
| 4,852,761 A | | 8/1989 | Turner et al. |
| 4,919,103 A | * | 4/1990 | Ishiguro et al. ............. 123/519 |
| 5,036,823 A | | 8/1991 | MacKinnon |
| 5,579,740 A | | 12/1996 | Cotton et al. |
| 5,640,989 A | * | 6/1997 | Nemoto et al. ............. 137/202 |
| 5,687,753 A | * | 11/1997 | Doll ............................ 137/43 |
| 5,960,817 A | * | 10/1999 | Johansen et al. ........... 137/202 |
| 6,182,693 B1 | * | 2/2001 | Stack et al. ................. 123/519 |
| 6,336,466 B1 | * | 1/2002 | Ganachaud et al. ........ 137/202 |

FOREIGN PATENT DOCUMENTS

| | | |
|---|---|---|
| DE | 37 04 641 A1 | 2/1987 |
| EP | 0 554 928 A1 | 8/1993 |

* cited by examiner

Primary Examiner—Gerald A. Michalsky
(74) Attorney, Agent, or Firm—Larson & Taylor, PLC

(57) ABSTRACT

Fuel tank comprising a canister containing a composition capable of retaining fuel vapours and which is associated with an overfill prevention device also located inside the tank.

6 Claims, 4 Drawing Sheets

Section A-A

Section A-A

FUEL TANK

Figure 1:
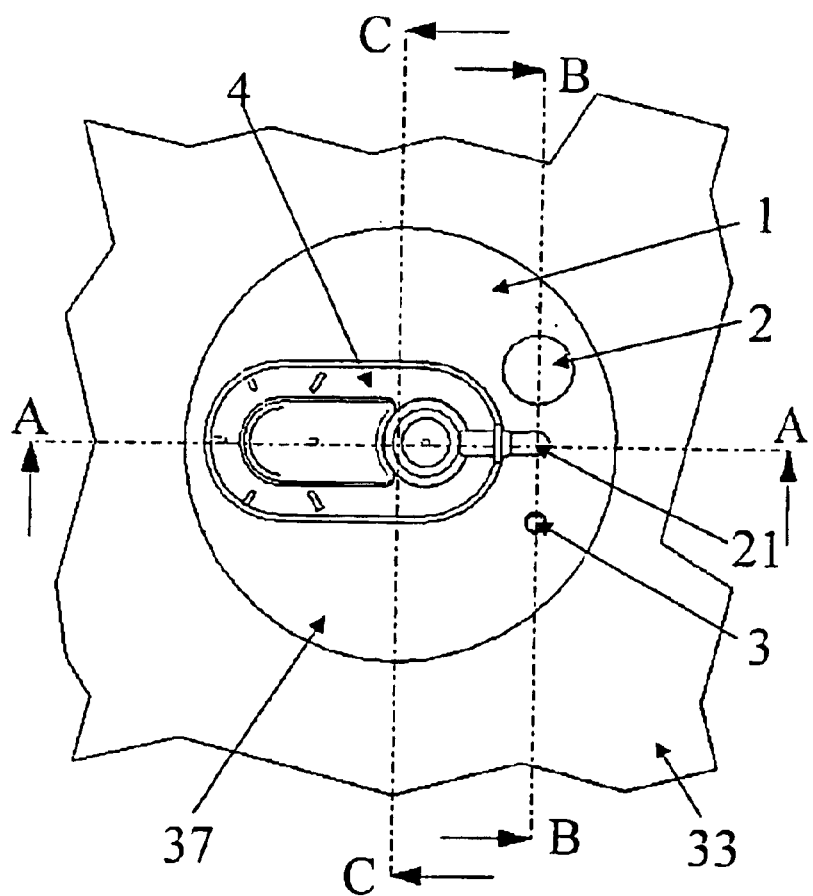
Figure 2:
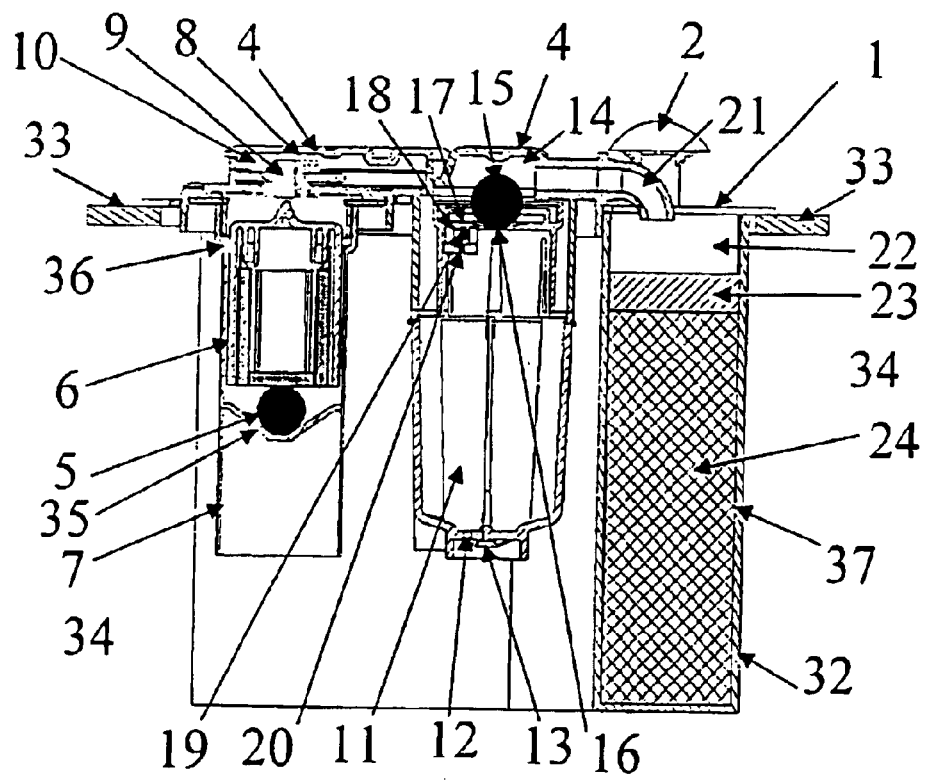
Figure 3:
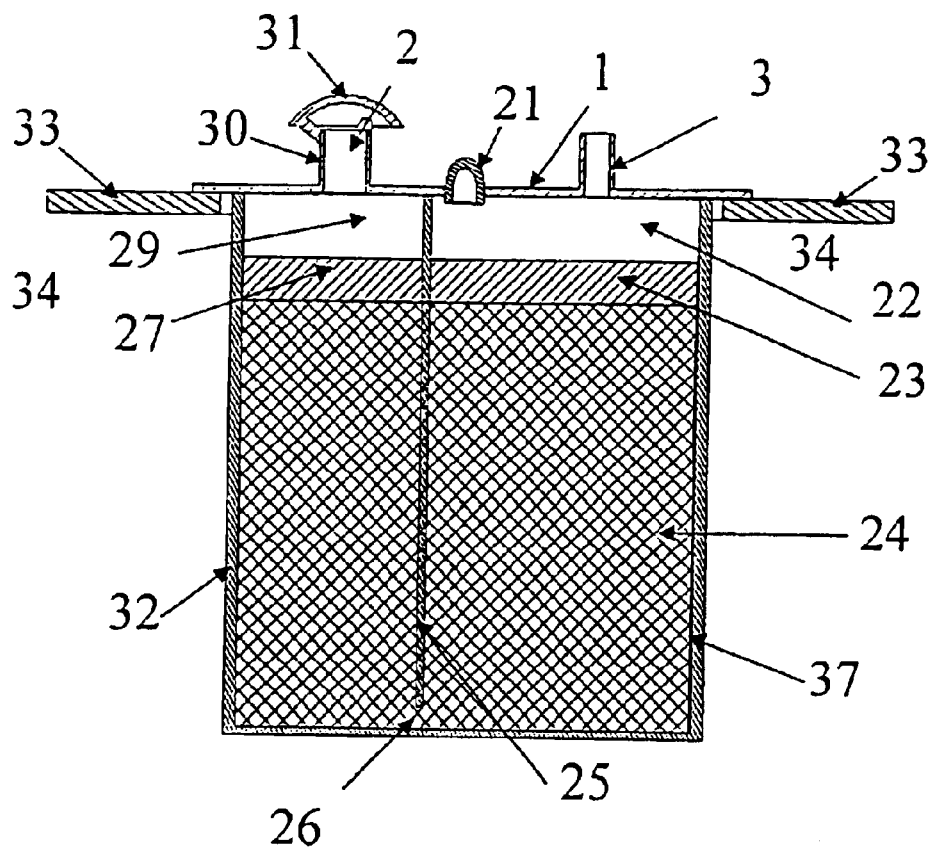
Figure 4:
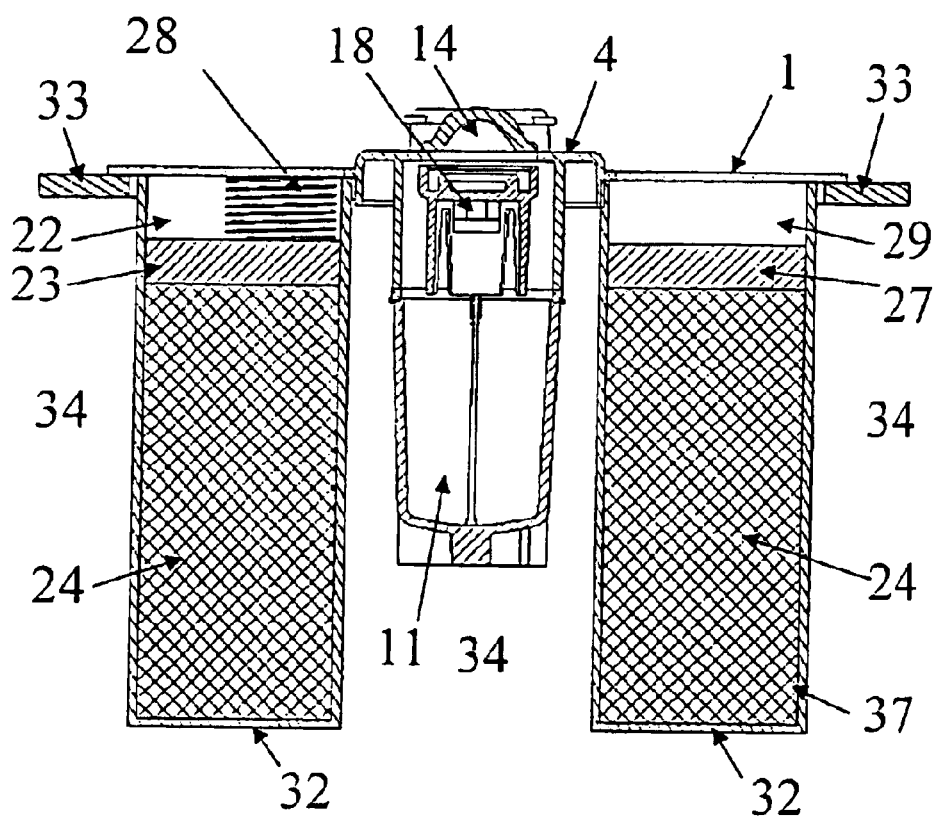

Current tanks for liquid or gaseous fuel need to meet a collection of safety standards because of the highly inflammable and often toxic nature of the fuel they contain. Fuel leaks through defective sealing and losses through evaporation have been the particular subject of increasingly tight regulations, particularly in applications to motor vehicles. In addition to the actual tank itself, a great many accessories associated with it may also contain fuel, for example: the conduits, various connections, pumps, filters, canisters for removing vapours, valves and safety devices, etc. These accessories often play a not insignificant part in fuel leaks of all kinds. They are sometimes even responsible for most losses of fuel from the overall system containing them together with the tank with which they are associated.

There has therefore been a search, in parallel with the reducing of the leaks caused by the tank itself, to minimize also those caused directly by each of these acessories and by the devices that interconnect them.

U.S. Pat. No. 4,852,761 discloses a tank equipped with a canister for retaining fuel vapours which is arranged inside the tank and comprises a safety valve preventing liquid from leaving the tank if the latter is inverted. This arrangement makes it possible to dispense with the conduit connecting the tank to the canister and to shorten the conduit connecting the refuelling vapour recovery device to this same canister.

According to this state of the art, the canister is not, however, associated with an OP device and the risk of evaporative losses due to the connections between this device and the canister are not insignificant.

Furthermore, the complexity of the mounting of this canister incorporated into the tank and of the independent OP device is still high. The same is true of other devices fulfilling the other function often encountered in fuel systems involving the presence of a tank (ORVR, OBD, etc.).

Furthermore, in the canister described in U.S. Pat. No. 4,852,761, the maximum fuel level permitted in the tank is relatively low, given the need not to exceed the level fixed by the position of the orifice situated at the lower end of the inclined tube internal to the canister and intended to return the liquid fuel to the tank, otherwise the separation of liquid fuel from vapours will be inhibited. Finally, a canister of this type may find itself immersed in the fuel if the tank is inclined at an exaggerated angle, when the valve which closes the tank off in the event of rolling-over has remained open because there is still a resultant force, of gravity which keeps the dense part of the valve in its lowered position. This situation may result in leaks of liquid fuel from the tank and in the composition with which the canister is filled ceasing its fuel-gas-retaining activity.

It is an object of the invention to overcome the drawbacks of the known tanks by providing a tank which cancels or very greatly limits the leaks of liquid and gaseous fuel to the external atmosphere while at the same time fulfilling the safety functions generally accomplished by modern fuel systems and very greatly simplifying the complexity of the mounting of the tank.

To this end, the invention relates to a fuel tank comprising a canister containing a composition capable of retaining fuel vapours, in which the canister is associated with an overfill prevention (OP) device preventing the tank from being overfilled and also located, at least partially, inside this tank.

A "tank" is to be understood as meaning a closed chamber, of varying shapes, generally sealed against the outside, which may be equipped with various internal accessories or accessories passing through the wall of the chamber.

The tank according to the invention may be made of any composition or material compatible with the fuels and the habitual conditions of use. It may, for example, by made of a material the composition of which contains at least one metal or one plastic. Tanks made up of at least one plastic are preferred.

A "plastic" is to be understood as meaning any synthetic polymeric material which is in the solid state under ambient conditions. Tanks made of plastic according to the invention may be in the form of single-layer or multilayer tanks. Tanks comprising one or more layers of high-density polyethylene are particularly preferred.

A "fuel" is to be understood as meaning any chemical composition capable of being burnt in the presence of an oxidizing agent, generally the oxygen in the air, which can be used in a combustion engine. Fuels may at ambient temperature be in any one of three states solid, liquid or gaseous. In vehicles, preference is generally given to fuels which are liquid or gaseous at ordinary temperature and at atmospheric pressure or higher. Liquid fuel such as petrol and diesel are particularly preferred.

An "engine" is to be understood as meaning any engine that converts the chemical energy contained in a fuel into mechanical energy. This may be any type of internal combustion engine, of the piston or rotary type, using liquid fuel (such as petrol, heavy oil, alcohol, etc.) or gaseous fuel (such as petroleum gas, natural gas, lean gas, hydrogen, methane, etc.). By extension, a "combustion engine" is also intended to cover one or more electric motors powered by at least one fuel cell when this fuel contains at least one hydrocarbon and/or an alcohol.

The canister contained in the tank according to the invention is a receptacle containing a composition, generally solid and granular, capable of retaining the fuel vapours of a gaseous stream. By way of an example of such a composition, mention may be made of granulated active charcoal. The canister may be made of any material or composition of materials compatible with the liquid and gaseous fuels with which it is intended to come into prolonged contact under the varying temperature and pressure conditions likely to be encountered inside fuel tanks. As a preference, the canister is at least partially made of plastic.

"Plastic" here has the same meaning as above. Thermoplastics and thermosets are particularly suitable. Thermoplastics have given good results.

According to the invention, the canister is contained in the tank, that is to say it is arranged completely or partially inside the latter. As a preference, it is arranged completely inside the tank.

When it is arranged completely inside the tank, the canister may be fixed to the tank by any known fixing means. Examples of possible fixing means are, non-limitingly: bottom, side or top wall in common with one wall of the tank, bottom, side or top wall welded to a wall of the tank, protrusion from a wall of the canister bolted onto a wall or an internal part secured to a wall of the tank, clipping of a wall of the canister into one or more glideways borne by or hollowed into an interior wall of the tank.

When it is arranged partially inside the tank, the canister penetrates a wall of the tank, for example the top wall. In this case, it is preferably closed in a sealed way by a cover carrying the gas inlet conduits containing the vapours that are to be purified and the clean-gas outlet conduits. In addition, it is advantageous for the cover to be made of at least one material which is practically impermeable to the fuels.

According to the invention, the canister is associated with an overfill prevention device preventing the overfilling of the tank.

An "OP device" is to be understood as meaning any device whose function is to fix the useful volume of the tank and prevent the liquid in the tank exceeding a predetermined level during the filling operation. It may be chosen from all known devices for fulfilling this function. The particular OP device with a dense ball which, by gravity, blocks off the gas outlet conduit of a capacity intended to receive liquid fuel has given good results. It is of particular benefit when the fuel vapours are discharged from the end external to the tank of the filling pipe.

The OP device according to the invention is also located, at least partially, inside the tank. The expression "at least partially inside" is intended here to mean arranged completely or partially inside the tank, just as was explained earlier on with reference to the canister.

Two other particular OP devices suited to the tank according to the invention are the float-type OP device and the OP device comprising a pair consisting of a dense part and a spring, the position of which follows the level of fuel.

The OP device is associated with the canister, that is to say it collaborates with the latter with a view to ensuring the overall safety of the tank with respect to the environment. This device may be associated with the canister in various ways. It may constitute a distinct device thereof, the association resulting solely from there being one or more means of communication with the latter such as, for example, a connecting conduit, an electric conductor, a mechanical linking member or, on the other hand, may share or place in common with the canister an essential element of the canister and/or of the OP device, such as a wall or an interior volume.

As a preference, the OP device shares at least one essential element with the canister. As a particular preference, the OP device shares at least one common wall with the canister.

A "common wall" is to be understood as meaning a wall which is used equally by the canister and by the OP device. This common wall may result from the assembly, prior to their use or after incorporation into the tank, for example by welding or bonding, of a wall of the canister with a wall of the OP device. Alternatively, the common wall may also result directly from manufacture, for example by the moulding of a complex device which encompassed both the canister and the OP device.

This OP device may also be fixed to the tank in a similar way to the way described above in respect of the canister. It may also, as an alternative, be fixed solely to the canister by any known means. In another alternative, it may be fixed both to the tank and to the canister.

In a first particular embodiment of the tank according to the invention, the canister is also associated with a liquid-vapour separating device located, at least partially, inside the tank.

A "liquid-vapour separating device" is to be understood as meaning any device capable of retaining the liquid fuel which, by entrainment, might accompany a stream of gas laden with fuel vapours. Quite specifically it denotes any device capable of retaining the droplets of liquid fuel carried along with the gases containing fuel vapours which might leave the tank. It may be made of any material compatible with the fuels. A liquid-vapour separating device made of thermoplastic gives good results.

According to this particular embodiment of the tank according to the invention, the canister is associated with the liquid-vapour separating device.

The term "associated" here has the same meaning as the meaning explained hereinabove in respect of the OP device.

The liquid-vapour separating device is arranged, in this embodiment, at least partially inside the tank. The expression "at least partially inside" has the same meaning here as the equivalent expression already explained above in respect of the OP device.

According to a second embodiment of the tank according to the invention, the canister is associated with a device (ROV or roll-over valve) for shutting off the tank breather in the event of the tank rolling over and which is located, at least partially, inside the tank.

In this second embodiment, just as in all the other embodiments which will be mentioned below, the definitions of the terms "associated" and "at least partially inside" are still the same as those already explained hereinabove.

The ROV device has the function of avoiding liquid fuel leaks from the tank, in the event of a gradual or, by contrast, very rapid movement of the position of the tank away from its normal position for which it was designed. One example is that of a tank secured to a moving body climbing a steep slope, or alternatively an on-board tank that forms an integral part of a system that experiences an abrupt rolling-over.

One particular case of the tank according to the invention is that of one or other of the two embodiments described above in which the tank comprises a liquid-vapour separating device and an ROV device. As a preference, the tank is at the same time in accordance with both embodiments described above; in other words, the canister is associated with each of the two devices each of which is arranged, at least partially, inside the tank.

As an even greater preference, the liquid-vapour separating device is situated above the ROV device. This arrangement offers the advantage of easier return, simply under gravity, of the liquid retained in the first device to the interior of the tank, via the valve of the ROV device which is open when the tank is in the normal position.

As a most especial preference, the liquid-vapour separating device in this particular case of the tank has at least one of the following forms:

funnel spiral system of multiple walls forming a labyrinth.

The spiral and labyrinth shapes are intended to impose abrupt changes in direction on the gaseous stream, so as to cause droplets of liquid fuel to condense, coalesce and be retained.

In the case of the funnel, the liquid fuel separated from the gaseous stream is collected under gravity at the lowermost point of the funnel. It can then advantageously easily be returned to the tank.

It is advantageously possible to associate several of the forms mentioned hereinabove in one and the same separating device.

According to a third embodiment of the tank according to the invention, the canister is associated with a device for recovering fuel vapours while the tank is being filled (otherwise known as an ORVR or on-board refuelling vapour recovery device) which itself is also located, at least partially, inside the tank.

Such an ORVR device has the function of ensuring that the environment is respected by retaining fuel vapours emitted while the tank is being periodically filled. It is one of the two means generally adopted for solving the problem of catching the vapours emitted during filling, the other being independent of the tank and consisting in equipping the fuel dispensing pump of the service station with a vapour extraction system.

Any ORVR device compatible with the fuel and the conditions in the tank and which can be associated with the canister is suitable. This device may be made of various materials, for example those containing at least one plastic. All types of plastic, thermoplastic or thermoset are appropriate. Thermoplastics have given good results.

Preferred ORVR devices are those which are capable of capturing all the vapours generated during the operation of filling an empty tank with fuel up to its maximum level. Such a system may, for example, be associated with a canister comprising enough fuel-vapour-retaining material to capture all the vapours generated during this operation.

According to a fourth embodiment of the tank according to the invention, the canister is associated with at least one pressure sensor of an on-board diagnostic (OBD) device which is located, at least partially, inside the tank.

On-board diagnostic systems are increasingly mounted in fuel systems comprising a tank. Their purpose is to make it easier to test these systems when they are being fitted, and during use, so as to be able to monitor their characteristics and their compliance with the various safety and environmental standards they are supposed to meet.

These systems are based on the collection of data supplied by a series of sensors arranged at precise locations in the fuel system. In particular, they often comprise one or more pressure sensors.

According to the invention, at least one of these pressure sensors is associated with the canister and is located, in least in part, inside the tank.

According to a fifth embodiment of the tank according to the invention, the canister is associated with at least one accessory located, at least partially, inside the tank.

An "accessory" is intended to mean any member in general through which fuel passes or which is in contact with fuel and which fulfils a particular function specific to the fuel system, including a function of transporting fuel between two other members.

As a preference, according to this embodiment, the canister is associated with at least one of the following accessories, this list being nonlimiting:

a fuel gauge, an electrical connection leading to a fuel gauge, a fuel pump, a drainable volume for collecting liquid fuel, an electrical connection for powering a fuel pump motor, a fuel line leading to a device supplying a combustion engine, a pressure gauge.

Any combination of at least two accessories may be used, there possibly being more than one of one same accessory.

According to a sixth embodiment of the tank according to the invention, the canister penetrates a wall of the tank via an orifice closed by a cover surmounting the canister and in contact, on the inside thereof, with a chemical composition capable of retaining fuel vapours.

The cover of the canister preferably closes the orifice in a wall of the tank in such a way that it is sealed off with respect to the liquids and gases under the pressure and temperature conditions customarily found in a fuel tank.

As a preference, this cover comprises at least one plastic impermeable to hydrocarbons. A cover which has given good results is made of impermeable thermoplastic. Examples of such hydrocarbon-impermeable plastics are, non-limitingly, polyethylene terephthalates, polyamides, polyketones, polyacetals and multilayer structures comprising, for example, at least one layer of high-density polyethylene and possibly a barrier layer that forms a barrier against hydrocarbons.

The closing of the orifice in the tank by the cover may be sealed by any possible means of assembly. It may, for example, be ensured by using a seal between the cover and the tank. In the case of a cover made of plastic and when the tank is itself also made of plastic, the tank orifice is sealed closed advantageously by welding the cover of the canister to the wall of the tank.

The chemical composition capable of retaining the fuel vapours has the same definition as the composition, generally solid and granular, defined above as being a composition with which the interior volume of the canister can be filled.

According to a seventh embodiment, one advantageous alternative form consists in causing part of the filling pipe to enter the tank in such a way as to be associated with the canister. It is thus possible for the canister/filling pipe assembly to be preassembled by any known means so that this assembly can be mounted in or on the tank in a single operation.

In the configuration where the canister lies fully inside the tank, it is also advantageous for all of the conduits and connections intended to leave the tank to be associated with the canister.

In this seventh embodiment, the term "associated" has the same meaning as described above with regard to the OP device.

When the canister is located partially outside the tank, another advantageous alternative form consists in gathering together all the conduits and connections leading to the tank in the part external to the tank. Thus, the tank has no orifice other than the one intended for the canister.

According to an eighth embodiment of the tank according to the invention, the canister may be associated with an electrically operated valve of the canister bleed circuit. The term "associated" here again has the same meaning as before, Two or more of the particular embodiments mentioned above may advantageously be combined.

One preferred combination is the one in which a DVMP-TOV valve is integrated into a canister placed in a tank. The DVMPTOV valve (Drainable-Volume Multi-Purpose Tank Overfill Valve) combines the ROV, tank breather, OP and liquid-vapour separating functions.

The invention also relates to a tank like one of those described hereinabove and intended to be mounted in a motor vehicle.

A "motor vehicle" is intended to mean vehicles propelled by a combustion engine, such as lorries, cars and motor cycles.

FIGS. 1 to 4 which follow are given with a view to illustrating, the invention without restricting its scope.

These figures depict a plan view (FIG. 1) of a canister suited to a tank for a motor vehicle according to the invention, and three elevations of the same canister corresponding to sections on the lines AA (FIG. 2), BB (FIG. 3) and CC (FIG. 4) as marked in FIG. 1.

In these figures, a cover (1) of circular shape made of PA of a canister (37) made of HDPE comprises a breather orifice (2), a bleed pipette (3) and a head of a multipurpose valve (4) with a drainable volume (11) and is welded to the wall of a tank (33) made of HDPE. This valve comprises a dense steel ball (5) surmounted by a float (6), the ball-float assembly lying inside a tubular part (7) in the form of a skirt in which the float (6) slides freely. The dense ball (5) rests on a perforated bottom (35) in the form of an inverted truncated cone, secured to the skirt (7) and lying approximately mid-way up the latter. The skirt (7), the perforated bottom (35) and the float (6) are made of polyacetal. A passage (36) in the top of the skirt (7) at a point located near the cover (1) provides communication between the inside of the tank (34) and the inside of the skirt (7). The latter is fixed to the head of the valve (4) by clipping. Surmounting the float (6) in the head of the valve (4) is a passage (9) delimited by an elastomer seal (10) and connecting the inside of the valve to a duct (8) lying in the head of the valve, above the level of the wall of the tank (33). The top of the float (6) has a shape capable of blocking off the passage (9) when it is in contact with the seal (10). The duct (8) opens into a cavity (11) which itself is also secured to the cover (1). At the base of the cavity (11) there is a passage (12) closed by a seal (13) in the shape of an inverted umbrella. A second cavity (14) surmounts the cavity (11) and is connected thereto by a passage closed off by a dense steel ball (16) allowing the tank to be closed off when it is in the position of rest close to the horizontal. In close proximity to the ball (16) there is a second passage (17) of smaller size, itself communicating with a small cavity (18) which contains a small-sized dense ball (19). Another passage (20) connects the small cavity (18) to the main cavity (11). The upper cavity (14) is extended by the line (21) incorporated into the cover (1) and which ends in another cavity (22) located under the bleed pipette (3). This last cavity (22) surmounts a bed of active charcoal granules (24) protected by a layer of soft gas-permeable polyurethane foam (23). A wall (25) separates the bed of granules (24) into two regions and leaves a space (26) between its base and the bottom of the canister (37) to allow communication between the two regions. Also arranged at the top of the bed (24) are protections (23) and (27) made of soft polyurethane foam, on each side of the wall (25). The protections (23) and (27) are held in place above the bed of granules (24) using metal springs just one (28) of which is illustrated for reasons of clarity. A cavity (29), symmetric with the cavity (22) is located above the protection (27) under the breather orifice (2). This orifice (2) itself is composed of a pipette (30) surmounted by a protective cap (31). The granules (24), the wall (25), the polyurethane-foam protections (23) and (27) and the cavities (22) and (29) are contained inside a receptacle (32) made of HDPE sealed hermetically by the cover (1). The parts of the canister (37) which are external to the receptacle (32) and to the main cavity (11) are in free communication with the inside of the tank (34).

The way in which the canister described hereinabove works is as follows: when the tank is in a normal position of rest, the gaseous phase sitting on top of the liquid fuel present in the tank is in communication with the open air via the passage (36), possibly via the space between the skirt (7) and the float (6) and via the passage (9), the duct (8), the cavity (11), the small cavity (18), the cavity (14), the line (21), the cavity (22), the bed of active charcoal (24), the cavity (29) and the pipette (30). If, for any reason, the gaseous atmosphere inside the tank experiences a modest overpressure, and the level of liquid fuel remains below a critical level situated below the level of the passage (36), the tank will be vented by exhausting some of the gases via this passage (36) and the path described hereinabove to exit in the open air, once the fuel vapours have been retained in the active charcoal (24). In this situation, the float (6) remains low enough to leave the passage (9) open. If liquid fuel were to be entrained with the gaseous stream, or if condensation were to occur, this liquid or this condensation would be retained in the volume (11). When the level of liquid fuel retained in the volume (11) exceeds a certain critical weight, the seal (13) opens and the liquid returns to the tank (34).

If there is an overpressure inside the tank when the level of liquid fuel exceeds a certain critical level, the float (6) rises and closes the passage (9), it being possible for the passage (36) to be immersed under the fuel, thus preventing large quantities of liquid from entering the duct (8), preventing the cavity (11) from filling, preventing the bed of active charcoal (24) from becoming immersed, and preventing fuel from leaking from the tank.

If the tank is accidentally rolled over, the ball (5) comes out of its housing and, under the effect of gravity, pushes against the float (6), thus shutting off any leak of liquid from the tank.

When the motor vehicle in which the tank is mounted remains stationary in the position close to the horizontal and the overpressure in the tank remains modest, the dense ball (15) rests on its seat and shuts off the passage (16), while the gaseous atmosphere in the cavity (11) communicates with the duct (14) via the narrow passage (17), and venting then continues in the normal way as explained above.

If there is a significant overpressure in the tank, such as that which occurs, for example, when the tank is being filled, the pressurized gas containing fuel vapours enters the passage (20), pushes the ball (19) which rises up in the cavity (18) and blocks off the passage (17) so as to close the tank.

If there is a depression inside the tank when the latter is stationary in the position close to the horizontal, the ball (19) drops back down inside the cavity (18). The latter has an internal shape such that when the ball (19) has reached its lowermost point, the passage (20) nonetheless still remains open.

If the vehicle is in motion, the dense ball (15) leaves its seat and opens the passage (16) which allows direct communication with the cavity (14) and the line (21).

What is claimed is:

1. A fuel tank comprising a canister containing a composition capable of retaining fuel vapours, wherein the canister is associated with an overfill prevention (OP) device preventing the tank from being overfilled above a predetermined maximum level during filling of the tank with fuel, said OP device being located, at least partially, inside said tank and the canister further being associated with a further device, responsive to overpressure and located, at least partially, inside said tank, for preventing fuel from entering said canister.

2. Tank according to the preceding claim, wherein the OP device has at least one wall in common with the canister.

3. Tank according to claim 1, wherein the canister is associated with a liquid-vapour separating device located, at least partially, inside the tank.

4. Tank according to claim 1, wherein said further device comprises a device (ROV) for shutting off a tank breather in the event of the tank rolling over.

5. Tank according to claim 1, wherein the canister penetrates a wall of the tank via an orifice closed by a cover surmounting the canister and in contact, on the inside thereof, with a chemical composition capable of retaining fuel vapours.

6. Tank according to claim 1 fitted inside a motor vehicle.

* * * * *